June 10, 1969  S. F. AIELLO ET AL  3,448,820
VEHICLE SEAT STRUCTURE

Filed July 20, 1967  Sheet 1 of 3

INVENTORS
SALVATORE F. AIELLO
JOHN W. BARTH
BY
Geo. J. Muckenthaler ATT'Y

INVENTORS
SALVATORE F. AIELLO
JOHN W. BARTH

United States Patent Office 3,448,820
Patented June 10, 1969

3,448,820
VEHICLE SEAT STRUCTURE
Salvatore F. Aiello, Racine, and John W. Barth, Cudahy, Wis., assignors to J. I. Case Company, Racine, Wis., a corporation of Wisconsin
Filed July 20, 1967, Ser. No. 654,777
Int. Cl. B60n 1/02; A47c 1/023; B60k 27/00
U.S. Cl. 180—77                                     4 Claims

ABSTRACT OF THE DISCLOSURE

A seating structure and arrangement including an inclined support for an operator's seat on a tractor wherein the seat can be moved from a lower to a higher position for the operator's comfort. The seating structure includes a support post and pivot means for reversing the direction of the seat for tractor or for implement operation. The design and arrangement of the support and pivot provides that the operator's seat is substantially at the same elevation when the operator is controlling either the tractor or the implement.

Background of the invention

The prior art in tractor seats shows that inclined structures have been used so that the operator can adjust the seat to this liking. These structures slope forwardly and downwardly and a short operator, of course, moves the seat forward to place his feet more firmly on the platform and to operate the foot controls and also to have better control of the steering wheel and the hand-operated buttons and levers. A tall operator moves the seat rearwardly for a more comfortable riding and operating position in that the seat is moved both rearwardly and upwardly on the inclined structure. The relative positions of the seat to the platform, the steering wheel and the tractor controls are important factors in tractor design which factors have been studied and considered by the industry to provide a more comfortable and safer ride.

Of course, suspension systems and padded seats and backs have also been incorporated into the seating structure to provide a more comfortable ride. Suspension systems have included many different forms of spring and linkage arrangements, the use of hydraulic cylinders, and other means such as hinged resilient means to cushion the ride.

With the advent of tractor-mounted equipment, it became even more important to place the operator in a comfortable and advantageous positions so that he could observe and control the working equipment in addition to operating the tractor. Front-mounted implements presented no great problem because the operator adjusted his seat for the most comfortable working position in relation to the steering wheel and the tractor controls. Also he could observe the implement when viewing along the sides of the tractor or across the top of the hood.

In the case of rear-mounted equipment, such as backhoes and the like, there has been provided one seat for tractor operation and another seat for implement operation. The tractor seat usually is located at a lower elevation for steering wheel and tractor control and the backhoe seat is usually at a higher elevation to place the operator in better view of the digging or other operation. This, of course, required the use of separate seats which adds to the expense and complication of the vehicle.

Recently, the industry has utilized what may be called a flip-over seat where the seat portion and the back portion served dual functions depending upon whether the seat was being used for tractor or for backhoe operation. These seats have various linkages or suspensions in the supporting structure so that the seat would be higher for backhoe operation, or, in some cases, the backhoe platform was at a higher elevation so that as the seat was flopped over the seat itself would be on a higher plane for the backhoe operation. Other tractor implement combinations have even gone to such lengths as to turn both the operator's seat and the tractor controls to a side or a rearwardly facing direction, so it is evident that much work has been done in the seating field.

Of course, improvements are constantly being sought in the seating structures and arrangements for tractor and/or backhoe operation and it is desirable to have one seat serve for both operations.

Summary of the invention

The present invention relates to a tractor carrying both front and rear-mounted equipments and more specifically to the seating structure and arrangement for a vehicle of this type. The arrangement involves the location and position of the seat in relation to the tractor platform, the steering wheel, the tractor controls, and the mounted equipment controls. The front-mounted equipment is shown as a loader and the rear-mounted equipment is shown as a backhoe, however other equipments could be described in this field in the practice of the invention. This invention covers a seating structure and arrangement wherein a reversible seat on an inclined structure is utilized in the tractor-backhoe combination. The seat structure is designed with a pedestal type support which carries the seat at substantially the same elevation in relation to the platform when the seat is in a forwardly or a rearwardly facing direction.

The principal object of the present invention is to provide a reversible seat for both tractor and mounted equipment operation.

Another object is to provide a seat and support structure which readily adjusts for the convenience of the operator.

A further object is to provide a seating arrangement wherein the seat is positioned for compatibility in relation to the platform, the steering wheel, and the tractor and equipment controls.

An additional object is to provide a seating structure which is simply and easily adjusted and positioned for tractor-backhoe operation and which structure maintains the seat at approximately the same distance above the platform for either operation.

Further objects and advantages of the invention will become apparent from a reading of the following detailed description taken together with the annexed drawings, in which.

Figure 1:
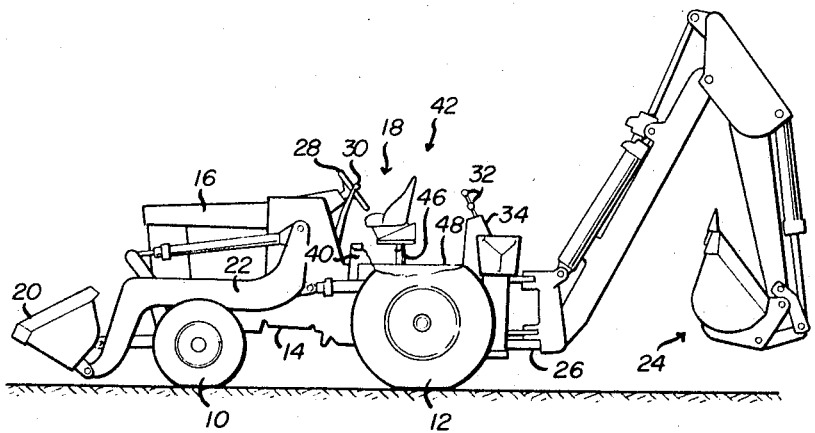
FIG. 1 is a side elevation of a tractor-backhoe combination showing the seat in the forwardly facing direction.

As seen in FIG. 1, there is shown a tractor-loader-backhoe combination which includes front wheels 10 and rear wheels 12 which carry a tractor frame 14. The frame, of course, supports the engine 16 and an operator's station, generally designated 18. The operator's station, being the essential part of the present invention, will be described in detail in relation to the combination unit. A loader bucket 20 is carried at the front of the tractor on support arms 22 and operated in suitable manner by hydraulic means, not necessary to further describe. A backhoe 24 is carried on the rear of the tractor by means of a swing tower 26. Since the backhoe itself is not a part of the present invention, it will not be further described.

Figure 2:
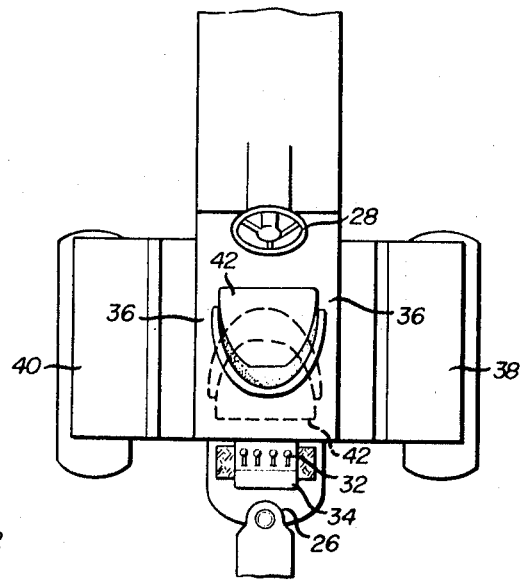
FIG. 2 is a plan view of a portion of the tractor and backhoe showing the seating structure in solid lines for tractor operation and in dotted lines for backhoe operation.
Figure 3:
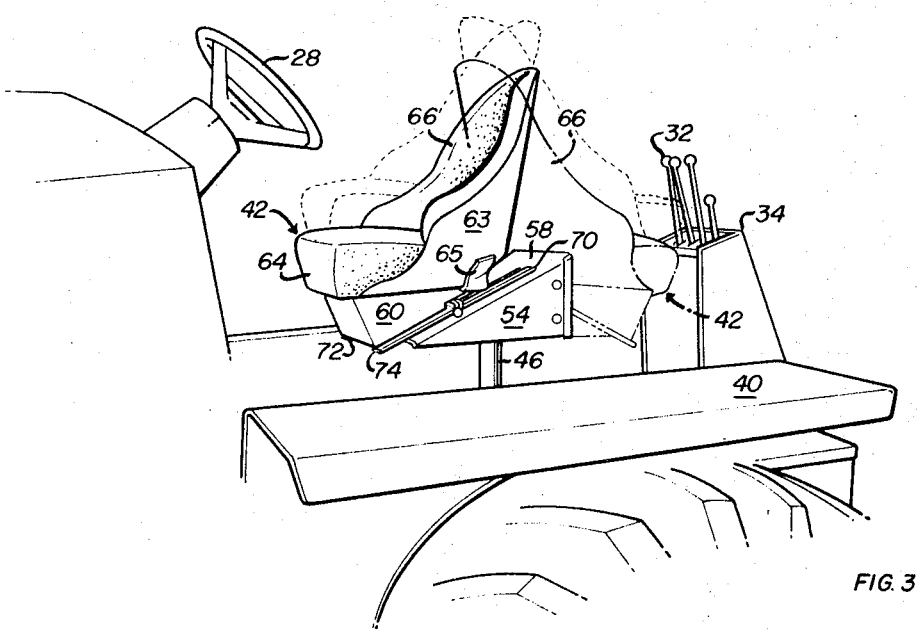
FIG. 3 is an enlarged perspective view showing the seat in the two positions, the dotted lines showing the elevated position to which the seat is raised when reversing the seat.

The tractor has a steering wheel 28 and controls and levers, as at 30, located in the appropriate places for operation of the vehicle. The controls, levers, pedals, etc. for tractor operation are conveniently placed adjacent or near the steering wheel. The backhoe controls 32 are supported from the rear of the tractor and a console 34 contains a substantial part of the working mechanism of these controls, as also seen in FIGS. 2 and 3. A platform 36 substantially covers the area from the rear of the engine and under the steering wheel to the backhoe control console in a fore-and-aft direction, and from one rear wheel fender 38 to the other fender 40. The platform therefore covers the transmission, the differential and most of the rear axle, as seen in FIG. 2. The steering wheel, tractor controls and the backhoe controls are designed, constructed, and placed in a compact manner such that only oneseat is required above the platform for operation of both vehicle and equipment.

Figure 5:
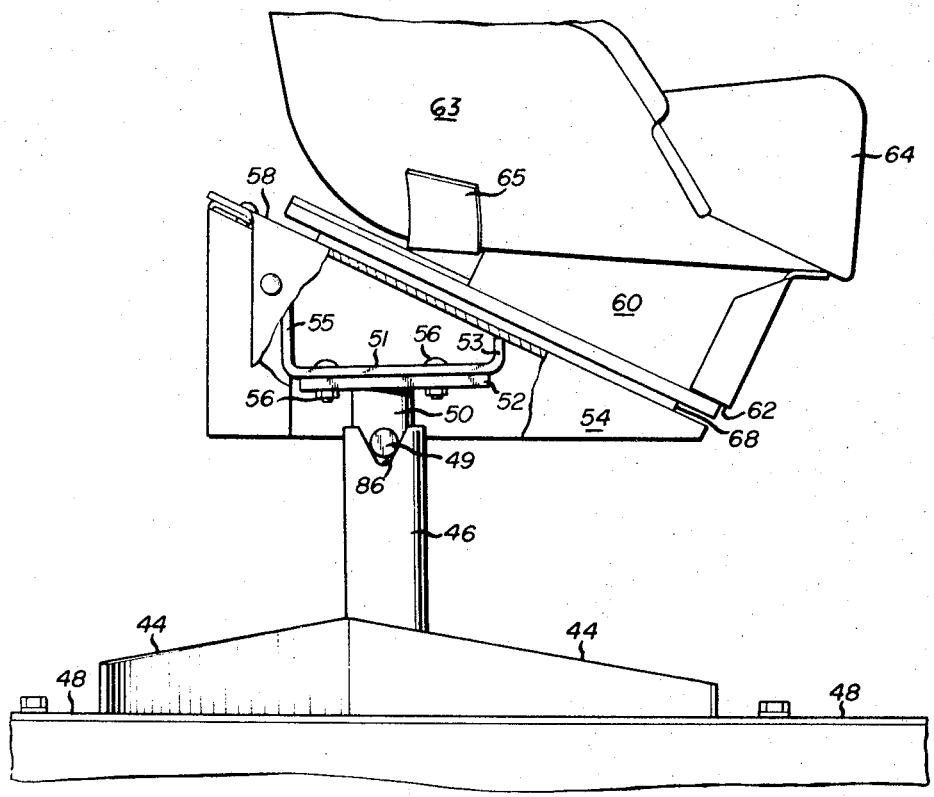
FIG. 5 is a side view of the supporting structure shown in FIG. 6, and including the seat.
Figure 4:
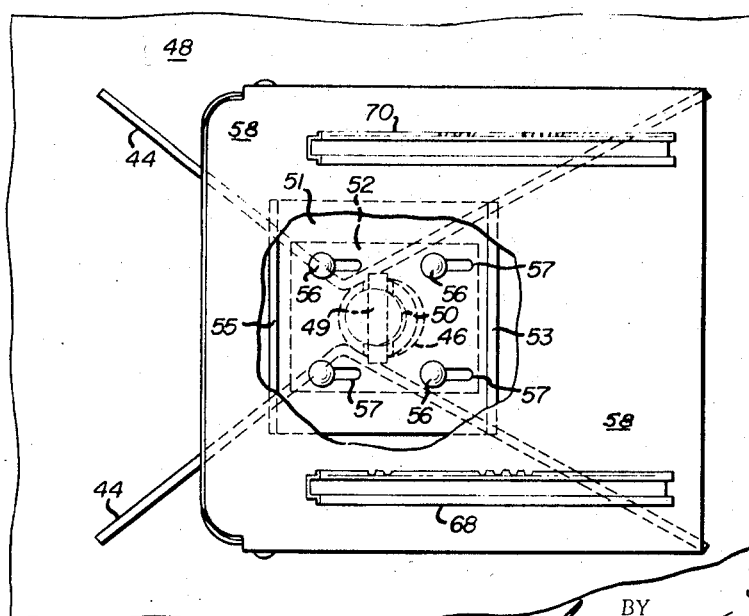
FIG. 4 is a plan view of the seat supporting structure with the seat removed.

An operator's seat structure, generally designated as 42, occupies a part of the operator's station and is located between the tractor controls and the backhoe console, as best shown in FIG. 3. Fixed to the platform, as by welding, are four spider plates 44, as seen in FIGS. 4 and 5, and an upright column or post 46 is secured to the plates 44 and to the platform 36. In the specific embodiment, a platform portion 48 under the seat is separate from the platform plates which cover areas directly under the steering wheel or alongside the seat. Smaller platform plates may be a part of the platform 36, these plates being removable for accessibility to certain parts which may require service. In this way, when it is desired to remove the seat for maintenance purposes, a part of the platform is unbolted from the tractor frame members. Of course, if the post 46 is welded to the spider plates 44 and the plates are in turn bolted to the platform portion 48, it would be possible to remove only the seat structure without removing the platform plate portion 48.

FIGS. 2 and 3 show the reversible seat in relation to the steering wheel and the backhoe controls, FIG. 2 showing a plan view of the seat facing forwardly and a dotted line view of the seat facing rearwardly, and FIG. 3 showing a perspective view of the seat in the two positions.

The seat supporting structure, also shown in FIGS. 4 and 5, includes an inner post 50 which is of smaller diameter than is post 46 so that it can slide up and down in the larger post. Inner post 50 includes a pin 49, the function of which will be further described. A rectangular plate 52 is secured, as by welding, to one end of post 50 and a triangular-shaped seat support 54 is attached by means of a support element 51, the element being secured to plate 52 by means of four bolts 56. Element 51 has upturned front and rear portions 53 and 55, the front portion 53 being low and the rear portion being high as shown in FIG. 5. Portions 53 and 55 are laterally displaced fore-and-aft of inner post 50 and are welded to the underside of the top plate support 54. Element 51 also includes four slots 57 fore-and-aft disposed, as shown in FIG. 4, for the purpose of adjusting the seat support 54 with attached element 51 in a generally horizontal fore-and-aft direction on plate 52. The seat assembly may thus be moved in this direction by use of the slots 57 and bolts 56. Support 54 is triangular-shaped looking at the side view thereof and, in one position of the support and the seat, presents an inclined or ramp surface 58 on the top side which runs downwardly and forwardly and upwardly and rearwardly. The terms fore-and-aft and front and rear are used in respect to the direction of travel of the tractor. As seen in FIG. 5, support 54 includes upright side portions and a rear portion which complete the design and cover the supporting element 51, plate 52 and the posts 46 and 50.

Figure 6:
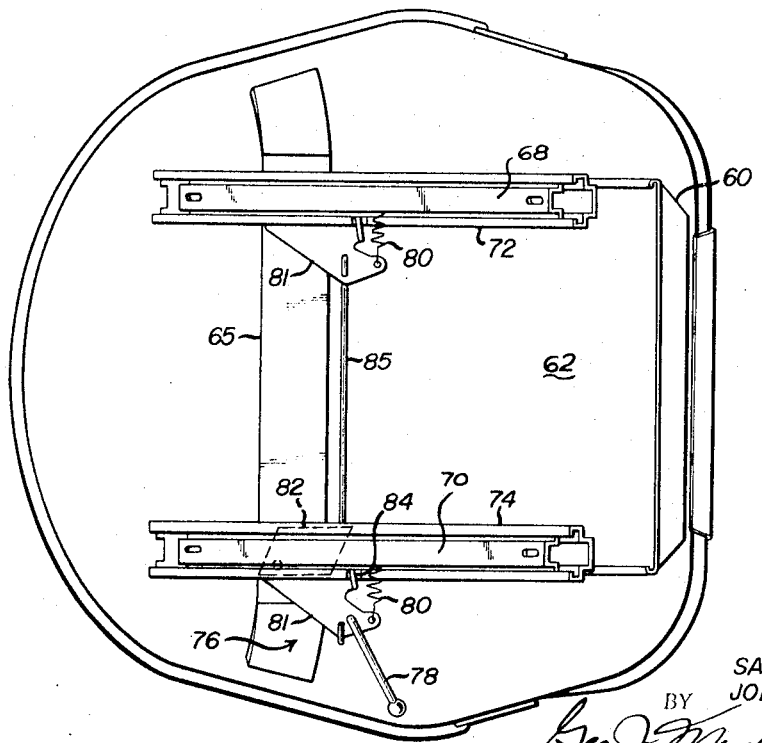
FIG. 6 is a bottom or inverted view of the seat showing the seat base with the spaced tracks and the latching mechanism.

A seat base 60 is carried on support 54 and the base is similarly shaped as the support and includes an inclined bottom surface 62 which interfits or mates with the surface 58 of the support. The seat proper includes a seat cushion 64 and a backrest 66 on a frame 63 which is secured to the base 60. As seen in FIGS. 3, 5, and 6, frame 63 includes a cross member 65.

Provision is made for moving the seat and base up-and-down on the inclined surface 58. A pair of channel-shaped tracks 68 and 70, as seen in FIG. 4, are secured to surface 58 and spaced apart so as to present a runway for the seat frame structure. As noted in FIGS. 4 and 5, these channel tracks run along the inclined surface 58 and extend substantially the length of the surface. Attached to the seat base 60 are guide elements 72 and 74, seen in a bottom view of the seat in FIG. 6, spaced to interfit and mate with the tracks 68 and 70. Tracks 68 and 70 can be described as hat-shaped with the open side upwardly and elements 72 and 74 are similarly hat-shaped with the open side down so that the guide elements slide smoothly on the tracks when adjusting the position of the seat along the inclined surface. Rolling means such as ball bearings are inserted between the tracks and guide elements to provide for smooth movement of the seat structure along the ramp. Tracks 68 and 70 include a series of notches along one side thereof for purposes to be described.

A releasable locking means 76 is provided on the side of the seat, this means including a seat lever 78 biased by a spring 80. Lever 78 is secured to an arm 81 which in turn is pivoted on a bracket 82 fixed to the underside of element 74 and an alignment lug 84 is secured to one end of the arm. One side of guide elements 72 and 74 includes a cutout for lug 84, the lug engaging in one of the series of notches as the seat is locked in any one position. One notch is selected for a certain desired position of the seat along the inclined surface and the handle and arm are held by the spring connected to the guide element and the arm. The seat adjustment lever 78 is moved rearward to disengage lug 84 from one of the notches in the guide element and the seat is slid manually to the desired position.

In some units a locking or latching mechanism is installed on only one track and guide element where it is deemed satisfactory to release and lock one side. However, in some cases, it is desirable to latch or lock both guide elements so as to prevent any twisting or binding action as the mechanism is operated and to maintain the seat secure along both tracks. In these cases both tracks include the notches and both guide elements include the bracket 82, arm 81, lever 78 and springs 80. A connecting link 85 is inserted in each of the arms 81 and whenever handle 78 is moved, the lugs 84 are moved out of the notches and the seat can be moved up-and-down the ramp to the desired position.

When it is desired to rotate or reverse the direction of the seat from tractor operation to implement operation or vice versa, the seat is manually raised a small amount and turned on support post 46. Post 46 has a V-shaped groove or slot 86 at the top, as seen in FIG. 5, and inner post 50 has the pin 49 fixed thereto for engaging in slot 86. The weight of the seat and the operator keeps the pin 49 in slot 86. When the seat is lifted by the operator for the purpose of reversing the direction thereof, the inner post 50 with the attached pin 49 is lifted with the seat and the pin is raised out of slot 86. The dotted outline in FIG. 3 shows the position that the seat assumes when it is lifted to permit rotation of the seat. When the seat has been turned a sufficient amount, the pin 49 drops into the slot 86 and is again held therein by the weight of the seat. Pin 49 also acts as a stop means for post 50 into post 46 so that the seat is at approximately the same elevation when placed in either the fore-or-aft facing direction.

As stated above, the seat support 54 is bolted to the plate 52 atop inner post 50 by way of element 51. Support element 51 has fore-and-aft elongated slots 57 for the securing bolts 56, and the support 54 and the seat can thus be moved a certain amount for horizontally fore-and-aft adjustment of the seat. This adjustment plus the seat movement on the inclined track structure provides adequate re-positioning of the seat for various attitudes of operator comfort. It is also noted that in FIG. 5, post 46, and of course, post 50 are not exactly normal to the platform portion 48. The centerline of these posts or pedestals is approximately 1½–2 degrees rearward from normal so that the seat is carried in a slightly rearward attitude in relation to the steering wheel and tractor controls. When the seat is turned for backhoe operation, the seat is carried at a slightly forward attitude in relation to the backhoe controls. The reason for this is because the operator assumes a more relaxed attitude when operating the tractor as his vision is normally directed beyond the front of the tractor. When operating the backhoe, the operator wishes to literally stay on top of his work and his vision is directed to the backhoe operating in the hole or trench immediately rearward of the traction wheels 12. Thus there is a differential of 3–4 degrees from the vertical between forward facing and rearward facing of the seat.

It is thus seen that herein shown and described is a seating structure and arrangement for a tractor-backhoe combination which utilizes one seat for both operations. The seat is mounted for adjustability in both a fore-and-aft and up-and-down direction and also for reversibility to operate either of the controls. The seating arrangement considers the position of the seat in relation to the platform, the tractor controls and the implement controls and therefore accomplishes all the objects and advantages as set out above.

What is claimed as new and desired to be secured by Letters Patent of the United States is:

1. A seat structure for a tractor carrying an earth working apparatus on the rear thereof and having tractor and apparatus controls spaced apart along the fore-and-aft direction of said tractor, a seat pedestal mounted on said tractor and being located in the space between said controls and extending upwardly along an upright axis and including a reversible piece at the upper end of said pedestal for reversing the facing direction of said piece about said upright axis, releasable lock means operative between said piece and the remainder of said pedestal for releasably holding said piece in both a forward and a rearward facing direction relative to said tractor fore-and-aft direction, an adjustable inclined ramp connected to the upper end of said piece and being adjustable along an incline plane and with said ramp being disposed to extend across said upright axis and being adjustable both in said fore-and-aft direction and vertically of said tractor, a seat on said ramp for supporting a person, said ramp and said seat both being connected with said reversible piece for reversing the facing direction of said seat realtively to said tractor fore-and-aft direction and along with the reversing of the facing direction of said reversible piece.

2. The subject matter of claim 1, wherein said adjustable inclined ramp includes a track portion affixed to said upper end of said reversible piece and includes a slidable portion mated with said track portion for effecting the adjustable movement of said ramp along said inclined plane, latch means releasably connected between said ramp portions for releasably securing said slidable portion in selected positions along said inclined plane.

3. The subject matter of claim 1, wherein said pedestal includes an upright sleeve affixed to said tractor and said reversible piece comprises a cylindrical post rotatable in said sleeve, and said releasable lock means comprises two uprightly faced notches on diametrically opposite sides of the upper edge of said upright sleeve and a pin projecting from said post and received in at least one of said notches in a corresponding rotated position of said post in said sleeve.

4. The subject matter of claim 3, wherein said adjustable inclined ramp includes a track portion affixed to said upper end of said reversible piece and includes a slidable portion mated with said track portion for effecting the adjustable movement of said ramp along said inclined plane, latch means releasably connected between said ramp portions for releasably securing said slidable portion in selected positions along said inclined plane.

References Cited
UNITED STATES PATENTS

| 2,312,030 | 2/1943 | Cramer et al. | 248—418 |
| 2,604,925 | 7/1952 | Swift | 297—349 X |
| 2,715,433 | 8/1955 | Dolgorukov | 248—429 X |
| 2,845,990 | 8/1958 | Hubert | 297—349 X |
| 2,954,071 | 9/1960 | Morrison et al. | 296—63 |
| 3,229,940 | 1/1966 | Kagels | 248—145 |
| 3,236,394 | 2/1966 | McMullen | 297—349 |
| 3,246,926 | 4/1966 | Link | 297—118 X |

FOREIGN PATENTS 879,279 10/1961 Great Britain.

KENNETH H. BETTS, *Primary Examiner.*

U.S. Cl. X.R.

248—420; 296—65; 297—314